No. 764,813. PATENTED JULY 12, 1904.
P. J. KAMPERDYK.
ELECTRIC BATTERY.
APPLICATION FILED DEC. 26, 1902.
NO MODEL.
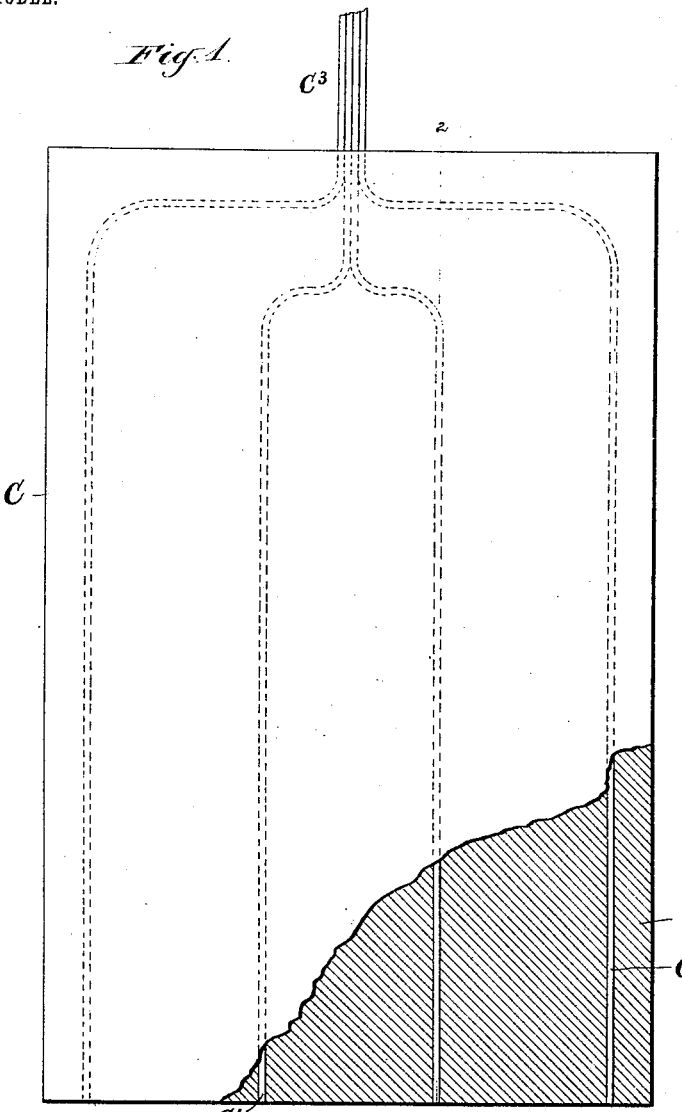
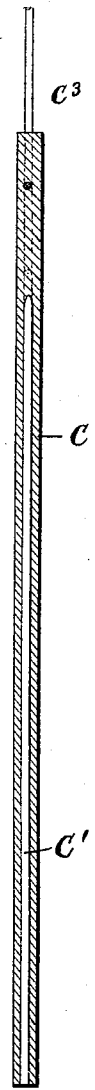
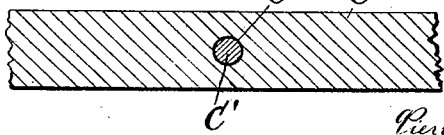

No. 764,813. Patented July 12, 1904.

UNITED STATES PATENT OFFICE.

PIERRE JOSEPH KAMPERDYK, OF NEW YORK, N. Y.

ELECTRIC BATTERY.

SPECIFICATION forming part of Letters Patent No. 764,813, dated July 12, 1904.

Application filed December 26, 1902. Serial No. 136,518. (No model.)

*To all whom it may concern:*

Be it known that I, PIERRE JOSEPH KAMPERDYK, a subject of the King of Belgium, residing in the city of New York, borough of Manhattan, in the county and State of New York, have invented certain new and useful Improvements in Electrodes for Electric Batteries, of which the following is a specification.

The invention relates to the construction of electrodes for primary batteries, and especially to the zinc or negative-pole electrode.

The object of the invention is to provide an electrode which shall develop greater activity through longer periods of service than any of the forms before known to me.

The invention consists in certain details of construction to be hereinafter described by which the above objects are attained.

The accompanying drawings form a part of this specification and show the invention as applied to a flat plate electrode.

Figure 1 is a face view of one of the electrodes, a portion being broken away to show the construction. Fig. 2 is a vertical section on the line 2 2 in Fig. 1, and Fig. 3 is a corresponding transverse section. Fig. 4 is a similar view of a portion on a larger scale.

Similar letters of reference indicate the same parts in all the figures.

It is important to avoid as far as practicable the waste of the electrode material due to disintegration and fracture when the electrode has been reduced by the action of the exciting liquid thereon. I provide for sustaining the electrode and insuring conduction throughout its mass by inclosing therein a framework of incorrodible material having high conductive properties.

The electrode is shown as a flat plate C of zinc, preferably amalgamated in the mass, containing a frame consisting of a series of copper wires C', covered by electrolysis or otherwise with a coat or plating $C^2$ of non-corrodible conducting metal, as platinum. The wires are placed in the desired positions in the mold, which is then filled with the melted zinc, entirely inclosing the wires, which thus serve as an indestructible framework to sustain the plate and maintain its plane shape until the electrode is nearly or quite exhausted in service. Besides lessening the liability of the attenuated plate to fracture the wires C' serve to electrically connect such portions of the zinc as remain after fracture or partial disintegration has taken place, and thus prevent the interruption of the current or action of the battery and permit the broken plate to continue in active service much longer than would be otherwise possible. The framework also serves to increase the conductivity or lessen the resistance of the electrode under all conditions.

The wires are shown as extending vertically of the plate from the lower edge nearly to the upper edge, where they are bent inwardly toward the center line. The ends of the several wires are brought together at this point and protrude from the upper edge of the plate, as at $C^3$, and serve as a connecting means for the negative pole of the battery.

The framework may be constructed otherwise than here shown and may be of any material possessing the necessary qualities of strength and conductivity and either of a nature to resist successfully the attacks of the exciting liquid or protected against such action by a coating or plating of conducting but incorrodible material.

Although I have shown the electrode as a flat rectangular plate of zinc, it will be understood that the shape is not essential and that the form and proportions may be varied within wide limits. The wires, extending as they do both longitudinally and transversely of the plate, serve to better strengthen the same.

I claim—

A negative-pole electrode comprising a flat plate of zinc, and a plurality of conducting-wires protected against corrosion and inclosed in said plate with their ends projecting from the upper edge thereof, the said wires extending both longitudinally and transversely of the plate and serving to maintain the shape of said plate when partially exhausted by the action of an exciting agent, and as conductors
5 connecting the several portions when said plate is fractured or partially disintegrated, and the said ends serving as a negative pole.

In testimony that I claim the invention above set forth I affix my signature in presence of two witnesses.

PIERRE JOSEPH KAMPERDYK.

Witnesses:
 HENRY HALKETT,
 J. LAWANS.